(12) United States Patent
Anderson (10) Patent No.: US 9,815,570 B2
(45) Date of Patent: Nov. 14, 2017

(54) AIRCRAFT WING SLAT SKEW DETECTION SYSTEMS AND METHODS

(71) Applicant: The Boeing Company, Chicago, IL (US)

(72) Inventor: Randall Eugene Anderson, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 14/683,036

(22) Filed: Apr. 9, 2015

(65) Prior Publication Data

US 2016/0297541 A1 Oct. 13, 2016

(51) Int. Cl.
*F16H 19/04* (2006.01)
*B64D 45/00* (2006.01)

(52) U.S. Cl.
CPC ......... *B64D 45/0005* (2013.01); *F16H 19/04* (2013.01); *B64D 2045/001* (2013.01)

(58) Field of Classification Search
CPC ...... B64D 45/0005; B64D 45/00; F16H 19/04
See application file for complete search history.

(56) References Cited

U.S. PATENT DOCUMENTS

| | | | | |
|---|---|---|---|---|
| 2,969,933 A | * | 1/1961 | Vogt | B64C 37/02 244/2 |
| 4,470,569 A | * | 9/1984 | Shaffer | B64C 9/22 244/213 |
| 5,628,477 A | * | 5/1997 | Caferro | B64C 9/02 244/195 |
| 5,680,124 A | * | 10/1997 | Bedell | B64D 45/0005 244/194 |
| 5,686,907 A | * | 11/1997 | Bedell | B64D 45/0005 244/194 |
| 6,299,108 B1 | | 10/2001 | Lindstrom et al. | |
| 6,466,141 B1 | * | 10/2002 | McKay | B64C 13/00 244/213 |
| 6,483,436 B1 | * | 11/2002 | Emaci | B64D 45/0005 244/194 |
| 7,048,234 B2 | * | 5/2006 | Recksiek | B64C 13/503 244/213 |
| 7,945,425 B2 | | 5/2011 | Marx et al. | |
| 8,115,649 B2 | | 2/2012 | Moy et al. | |
| 8,646,346 B2 | | 2/2014 | Hubberstey et al. | |
| 2008/0265090 A1 | | 10/2008 | Schievelbusch | |

(Continued)

FOREIGN PATENT DOCUMENTS

| | | |
|---|---|---|
| EP | 1 088 753 A2 | 4/2001 |
| EP | 2 881 714 A1 | 6/2015 |

*Primary Examiner* — Justin M Benedik
(74) *Attorney, Agent, or Firm* — Haynes and Boone, LLP (57) ABSTRACT

An apparatus for detecting skew in a slat of an aircraft wing includes an elongated track moveably supported in the wing for longitudinal movement toward and away from a leading edge of the wing. The slat is coupled to a forward end of the track for conjoint movement therewith. An actuator is configured to selectably drive the track and slat between retracted and extended positions relative to the leading edge of the wing. A pinion gear is rotatably mounted in the wing and disposed in rolling engagement with a rack gear disposed on the track, and a sensor is coupled to the pinion gear and configured to sense the longitudinal position of the slat as a function of a rotational position of the pinion gear.

16 Claims, 8 Drawing Sheets

(56) References Cited

U.S. PATENT DOCUMENTS

| | | | |
|---|---|---|---|
| 2010/0288886 A1* | 11/2010 | Schievelbusch ... | B64D 45/0005 244/194 |
| 2011/0290946 A1* | 12/2011 | Peirce ................ | B64D 45/0005 244/213 |
| 2013/0126670 A1 | 5/2013 | Vaghela | |

* cited by examiner

AIRCRAFT WING SLAT SKEW DETECTION SYSTEMS AND METHODS

BACKGROUND

1. Technical Field

This disclosure relates to aerodynamic control surfaces of aircraft in general, and more particularly, to systems and methods for detecting aircraft leading-edge wing slat skew.

2. Related Art

Slats are aerodynamic surfaces on the leading edges of the wings of fixed-wing aircraft that, when extended, enable the wing to operate at a higher angle of attack and/or a slower speed without stalling. A higher coefficient of lift is produced as a result of angle of attack and air speed so that, by extending its slats, an aircraft can fly at slower speeds, and/or take off and land within shorter distances. Slats are usually used while landing or performing other low-speed maneuvers that are close to the aircraft's stall speed, but are usually retracted during normal, high-speed flight so as to minimize their aerodynamic drag.

Modern slats are installed at the leading edges of an aircraft's wings in bilaterally symmetrical pairs, and during operation, are all extended and retracted simultaneously with each other. However, certain failures of the structural members or the drives of the slats of some types of modern aircraft can result in a condition referred to as "skew," in which one end of the slat becomes stuck or decoupled from the associated slat drive mechanism during extension or retraction, thereby allowing that end of the slat to become displaced relative to those of the other slats. Due to the stiffness of the slats, this creates only relatively small deflections when aerodynamic loads are applied to that slat during flight. However, if this type of failure goes undetected, the slat can become completely disconnected from the aircraft wing, resulting in the loss of the slat, and potentially, a more serious type of failure.

In particular, the loss during flight of slats that are located more outboard on the wing of an aircraft, while aerodynamically undesirable, is not deemed as serious as the loss of the slats located more inboard on the wing, because the former are typically smaller, and will simply fly harmlessly rearward in the slipstream of the aircraft, whereas, the latter, which are typically larger, heavier and located more toward the centerline of the aircraft, could collide with and damage the empennage, i.e., the rudder and/or elevators, of the aircraft, thereby resulting in a more serious loss of aircraft control.

Some modern commercial jet aircraft typically incorporate two bilaterally symmetrical wing-mounted engines, with one pair of slats being mounted inboard of the engines and six pairs of slats being mounted outboard of the engines. For the foregoing reasons and others relating to skew detector size and cost, conventional slat skew detection systems typically ignore the smaller, most outboard pair of slats, and detect skew in all of the remaining slats, except for the outboard ends of the pair of slats located immediately inboard of the most outboard pair, and the inboard ends of the pair of slats located immediately outboard of the engines.

Accordingly, what is needed are systems and methods for detecting skew of an aircraft wing slat regardless of its size or location within the wing, and for doing so reliably and without adding significant weight or cost to the aircraft.

SUMMARY

In accordance with the present disclosure, example systems and methods are provided that are capable of detecting skew in any wing slat of a practical size, regardless of its location within the wing, and of doing so reliably and without adding significant weight or cost to the aircraft.

In one example embodiment, an apparatus comprises a rack gear disposed on an elongated track, a pinion gear disposed in rolling engagement with the rack gear, and a sensor coupled to the pinion gear and configured to sense the longitudinal position of the track as a function of a rotational position of the pinion gear.

In another example embodiment, an apparatus for detecting skew in a slat of an aircraft wing includes an elongated track moveably supported in the wing for longitudinal movement toward and away from a leading edge of the wing. The slat is coupled to a forward end of the track for conjoint movement therewith. An actuator is configured to selectably drive the track and slat between retracted and extended positions relative to the leading edge of the wing. A pinion gear is rotatably mounted in the wing and disposed in rolling engagement with a rack gear disposed on the track, and a sensor is coupled to the pinion gear and configured to sense the longitudinal position of the slat as a function of a rotational position of the pinion gear.

In yet another example embodiment, a method comprises driving an end of a wing slat longitudinally with an elongated track between a retracted position and an extended position relative to a leading edge of a wing, rotatably mounting a pinion gear within the wing and in rolling engagement with a rack gear disposed on the track, coupling a rotary position sensor to the pinion gear, and using the sensor to sense the longitudinal position of the end of the slat as a function of a rotational position of the pinion gear.

A better understanding of the aircraft slat skew detection systems and methods of the present disclosure, as well as an appreciation of the above and additional advantages thereof, will be afforded to those of skill in the art by a consideration of the following detailed description of one or more example embodiments thereof. Reference will be made to the various views of the appended sheets of drawings, which are briefly described below, and within which like reference numerals are used to identify like ones of the elements illustrated therein.

DETAILED DESCRIPTION

In accordance with the present disclosure, example systems and methods are provided for detecting a leading edge wing slat skew condition in an aircraft reliably and without adding significant weight or cost to the aircraft.

Figure 1:
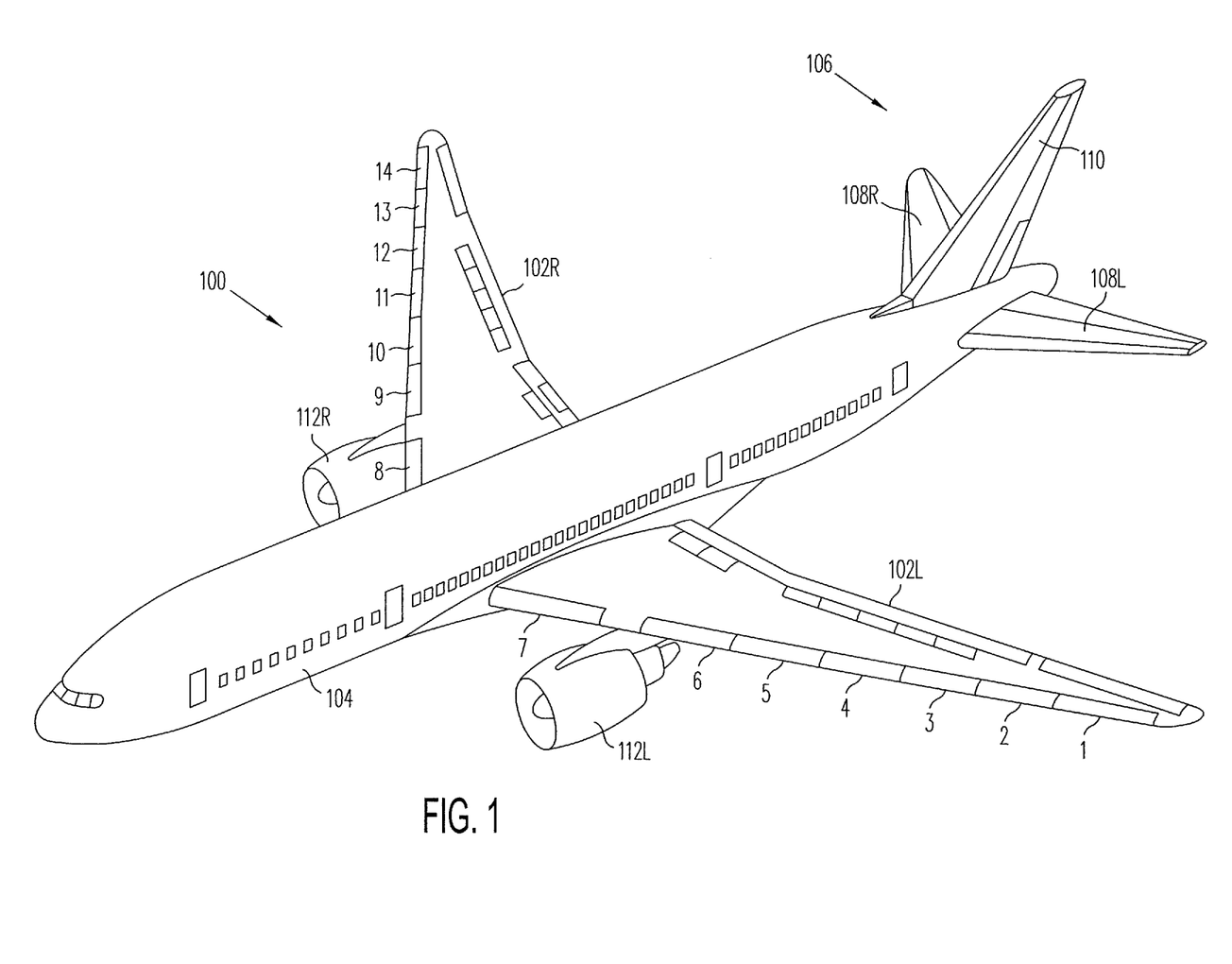
FIG. 1 is an upper, left side perspective view of a modern commercial jet aircraft equipped with a plurality of slats disposed along the leading edges of its wings.

FIG. 1 is an upper, left side perspective view of a modern commercial jet aircraft 100 equipped with a plurality of slats 1-14, which are disposed along the leading edges of its wings 102L and 102R in pairs, e.g., 1/14, 2/13, 3/12, and so on, that are bilaterally symmetrical with respect to a centerline of the aircraft 100. The aircraft 100 also conventionally includes an elongated fuselage 104 and an empennage 106, comprising a pair of horizontal stabilizers and associated elevators 108L and 108R, and a vertical stabilizer and associated rudder 110.

Like many passenger jet aircraft today, such as the Boeing 757, 767, 777 and 787 models, the example aircraft 100 of FIG. 1 includes a pair of bilaterally symmetrical, wing-mounted turbofan engines 112L and 112R, with one pair 7/8 of the slats 1-14 being mounted inboard of the engines 112L and 112R and six pairs 1/14, 2/13, 6/9 of the slats 1-14 being mounted outboard of the engines 112L and 112R. As discussed above, during operation, all of the slats 1-14 of both wings 102L and 102R are typically extended and retracted simultaneously with each other. Because of this and the bilaterally symmetrical nature of the slats 1-14, it should be understood that, in the following discussion, a description of e.g., the configuration or operation of a given slat or feature thereof, unless otherwise indicated, will likewise apply, but in a symmetrical fashion, to its "twin" disposed on the opposite-side wing of the aircraft 100.

As those of some skill will understand, a jam in or a disconnect from a slat drive mechanism can cause a skew condition to occur in one or both ends of a slat, causing one or more of the slats to fail to move in a manner that maintains alignment along an axis with the other slats during their extension and/or retraction. FIGS. 2A-2D are schematic top plan views of a subset 2-6 of the slats 1-7 disposed on the left wing 102L of the aircraft 100 of FIG. 1 and outboard of its left engine 112L, showing various possible skew conditions of an intermediate one, viz., slat 4, of the outboard flaps 2-6 relative to a reference line 200 extending through all of the slats 2-6.

Figure 2A:
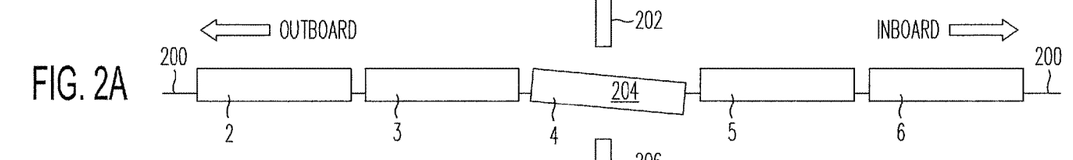
FIGS. 2A-2D are schematic top plan views of a subset of the left wing leading edge slats disposed outboard of a left engine of the aircraft of FIG. 1, showing various possible skew conditions of an intermediate one of the slats.
Figure 2B:
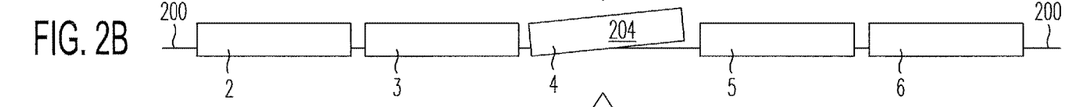
Figure 2C:
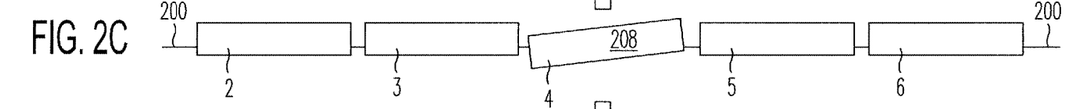
Figure 2D:
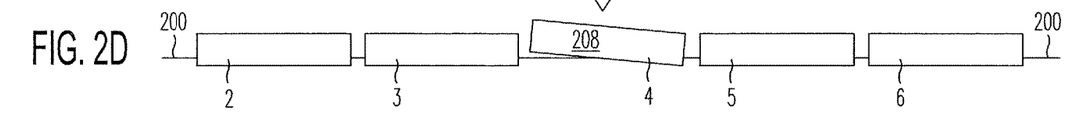

Thus, in FIG. 2A, when the slats 2-6 are all extended simultaneously from a retracted position and in the direction indicated by the arrow 202, the inboard end 204 of the slat 4 could remain "stuck" in the retracted position. Alternatively, as in FIG. 2B, when the slats 2-6 are all retracted simultaneously from an extended position and in the direction indicated by the arrow 206, the inboard end 204 of the slat 4 could remain stuck in the extended position. As illustrated in FIGS. 2C and 2D, a similar skew condition could occur in the outboard end 208 of slat 4 during extension 202 or retraction 206 of the slats. It is also possible for both ends of a given slat to become skewed relative to the other slats, and for more than one of the slats to become skewed. As discussed above, due to the relatively stiff nature of the slats, the type of skew illustrated in FIGS. 2A-2D creates only relatively small deflections when aerodynamic loads are applied to the affected slat during flight. However, if this type of failure goes undetected, the slat could become completely disconnected from the aircraft wing, resulting in the loss of the slat, and potentially, a more serious type of failure, as discussed above. Accordingly, it is desirable to provide systems for detecting a skewed condition in a wing slat.

Figure 3:
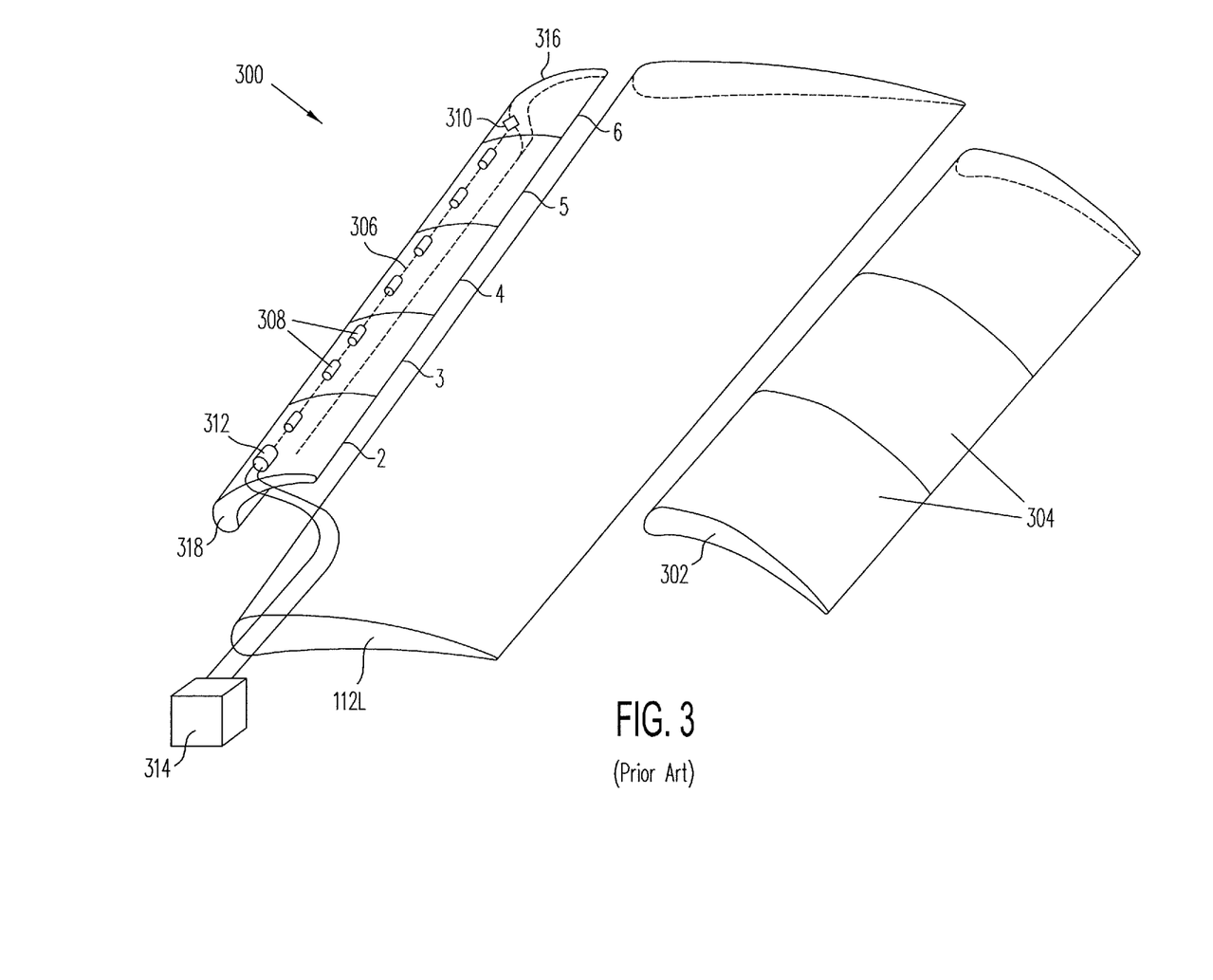
FIG. 3 is a partial upper, outboard end perspective view of the left wing of the aircraft of FIG. 1, showing a prior art system for detecting a slat skew condition in the subset of slats located outboard of the left engine thereof.

FIG. 3 is a partial upper, outboard end view of the left wing 102L of the aircraft 100 of FIG. 1, showing a prior art system 300 for detecting a skew condition in the subset 2-6 of the slats 1-6 located outboard of the left engine 112L thereof. As can be seen in FIG. 3, the wing 112L can also include a flap assembly 302 comprising one or more flaps 304 extending rearwardly from a trailing edge of the wing 112L, and which can be extended rearwardly and downwardly in cooperation with the slats 1-7 to change the curvature of the wing 102L, and thereby increase its coefficient of lift at low speeds, as discussed above.

As illustrated in FIG. 3, the prior art slat skew detection system 300 can be similar to those described in, e.g., U.S. Pat. No. 5,680,124 to J. Bedell et al., or U.S. Pat. No. 8,115,649 to G. Moy, et al., the entire disclosure of each of which is incorporated herein by reference, and can comprise an elongated, flexible cable 306 that extends through a plurality of cable guides 308 disposed within each of the slats 2-6. The cable has one end 310 fixed within slat 6, inboard of its outboard end, and an opposite second end connected to a sensor 312, e.g., a proximity sensor, disposed inboard of the outboard end of slat 2. The sensor 312 is electroconductively coupled to a controller 314, which is configured to produce an alarm signal upon the detection of a skew condition in any one of slats 2-6.

During their retraction and extension, the slats 2-6 move toward and away from the wing 102L simultaneously with each other, as discussed above, and hence, the cable 306, which can comprise, e.g., a twisted wire cable that is encapsulated within a low-friction jacket, such as NYLON or TEFLON for easy sliding within the guides 308, moves in a straight line, along with the slats 2-6. However, if one of the slats 2-6 becomes skewed, as discussed above in connection with FIGS. 2A-2D, the skew causes a pulling or tension force to be exerted in the cable 306, and hence, the sensor 312, causing it to produce a skew alarm. Thus, while the skew detection system 300 can detect that a skew condition has arisen in one or more of the slats 2-6, it cannot detect where or within which slat(s) it has occurred.

As can be observed in connection with the prior art skew detection system 300 of FIG. 3, 1) any skew in the slats 1 and 7, i.e., the most inboard and outboard slats 1-7 of the wing 102L, are not detected by the system 300, and 2) because the inboard end 310 of the flexible cable 306 is disposed outboard of the inboard end 316 of slat 6, and the outboard end of the cable 306 is disposed inboard of the outboard end 318 of slat 2, skews occurring at either of the ends 316 or 318 of slats 6 and 2 cannot affect the cable 306, and hence, are also not detected by the prior art system 300. Thus, the two slat ends 316 and 318 represent two "blind spots" in the "detection field" of the prior art system 300.

Regarding the detection of skew in slat 1, i.e., the most outboard one of the slats 1-7, conventional slat skew detection systems 300 typically ignore the smaller, most outboard pair of slats 1 and 14 of the aircraft 100, because, as discussed above, their loss during flight is not deemed as serious as the loss of one or more of the slats located more inboard on the wings, i.e., slats 2-7 and 8-13. Thus, while it is possible in some embodiments to move the outboard end of the cable and sensor 312 into slat 1 so as to include the outboard end 318 of slat 2 and the inboard end of slat 1 within the detection field of the system 300, the outboard end of slat 1 and the inboard end 316 of slat 6 would still comprise blind spots in the modified system.

Figure 4:
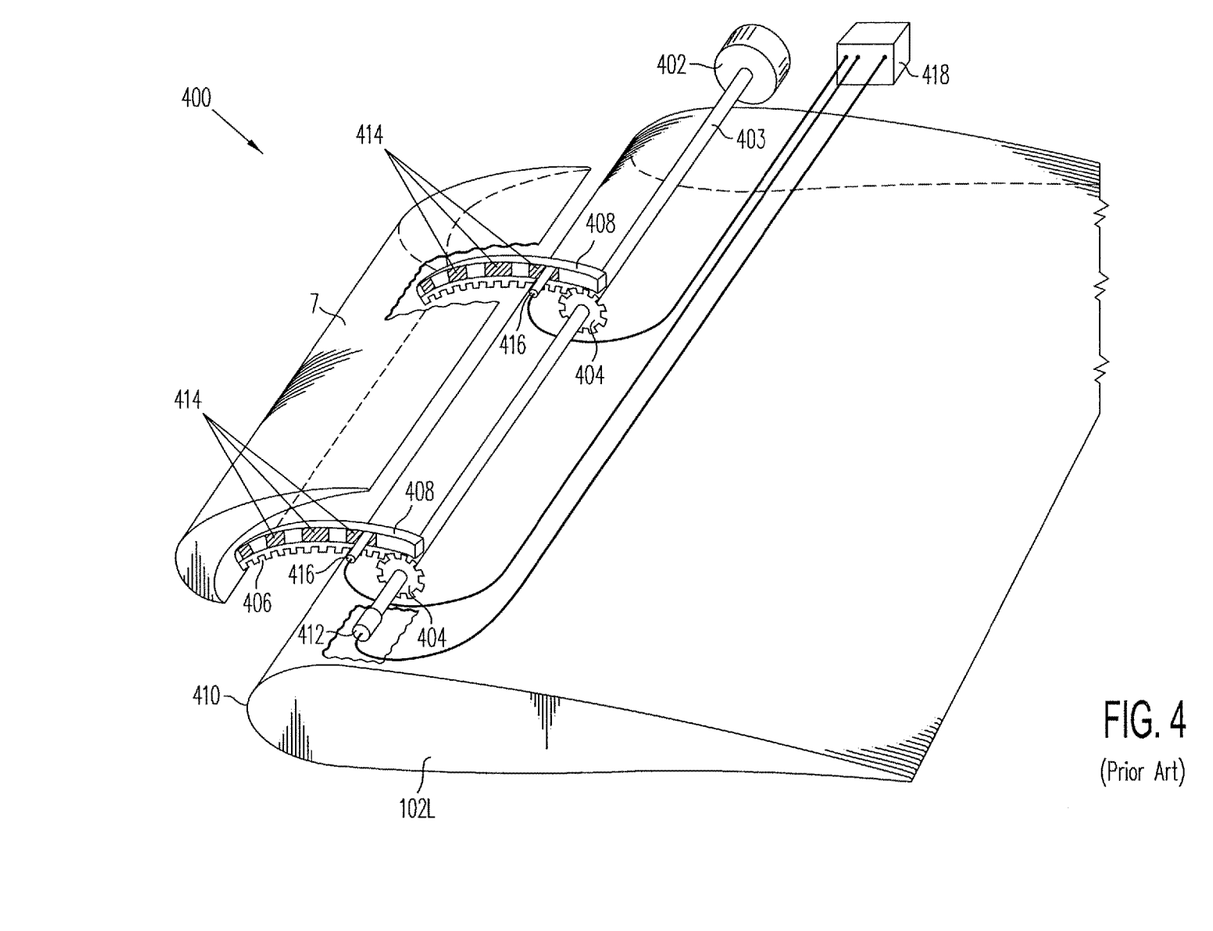
FIG. 4 is a partial upper, outboard end view of the left wing of the aircraft of FIG. 1, showing a prior art system for detecting a skew or loss condition in the slat located inboard of the left engine thereof.

Regarding the detection of skew in slat 7, i.e., the most inboard one of the slats 1-7, it is not practicably feasible to extend the flexible cable 308 of the conventional slat skew detection systems 300 past the pylon supporting the left engine 112L disposed between slats 6 and 7, and accordingly, as illustrated in FIG. 4, slat 7 is conventionally provided with an alternate type of skew detection system 400.

FIG. 4 is a partial upper, outboard end view of the left wing 102L of the aircraft 100 of FIG. 1, showing the prior art skew detection system 400, which can be implemented in a manner similar to those described in U.S. Pat. No. 5,680,124 above or in U.S. Pat. No. 8,646,346 to M. Hubberstey, et al. As illustrated in FIG. 4, the slat 7 is selectably extended and retracted by a rotary actuator 402 that drives a drive shaft 404, e.g., a "torque tube," upon which is mounted a pair of drive gears 404. Each drive gear 404 is disposed in driving engagement with a corresponding one of a pair of rack gears 406 respectively disposed on the bottom of a corresponding one of a pair of elongated slat tracks 408 respectively disposed at a corresponding end of the slat 7. The outer ends of the slat tracks 408 are coupled to the slat 7, and the inner ends of the slat tracks 408 are supported on rollers (not illustrated) disposed within the wing 102L for longitudinal extension and retraction away from and toward the leading edge 410 of the wing 102L, respectively. In the particular embodiment of FIG. 4, in which slat 7 is shown in an extended position, the slat tracks 408 are arched upwardly, such that movement of the slat 7 relative to the leading edge 410 of the wing 102L is forward and downward upon extension, and rearward and upward upon retraction.

As illustrated in FIG. 4, a rotary position sensor 412, e.g., a resolver, is disposed at the end of the drive shaft 404, and each slat track 408 is provided with a plurality of discrete magnetic proximity targets 414 distributed along its length. A corresponding pair of proximity sensors 416, each of which can comprise, for example, a magnetic, Hall-effect, optical, capacitive or inductive sensor, are disposed within the wing 102L in spaced opposition to the targets 414 respectively disposed on the slat tracks 408. The respective output signals of the rotary position sensor 412 and the proximity sensors 416 are conveyed to a skew detector unit 418, which compares the outputs of the proximity sensors 416 with each other and that of the angular position sensor 412 to detect a skew in either or both of the ends of the slat 7 relative to the positions of the other slats 1-6.

However, while the skew detection system 400 provides a satisfactory mechanism for detecting skews in slat 7 (and its similarly provisioned symmetrical twin, slat 8), it is too large, heavy, complex and expensive to be implemented in slats 1-6 or the "blind spots" of the prior art system 300 discussed above, and in particular, at the inboard end of slat 6, where a skew detection system is more acutely indicated.

Figure 5:
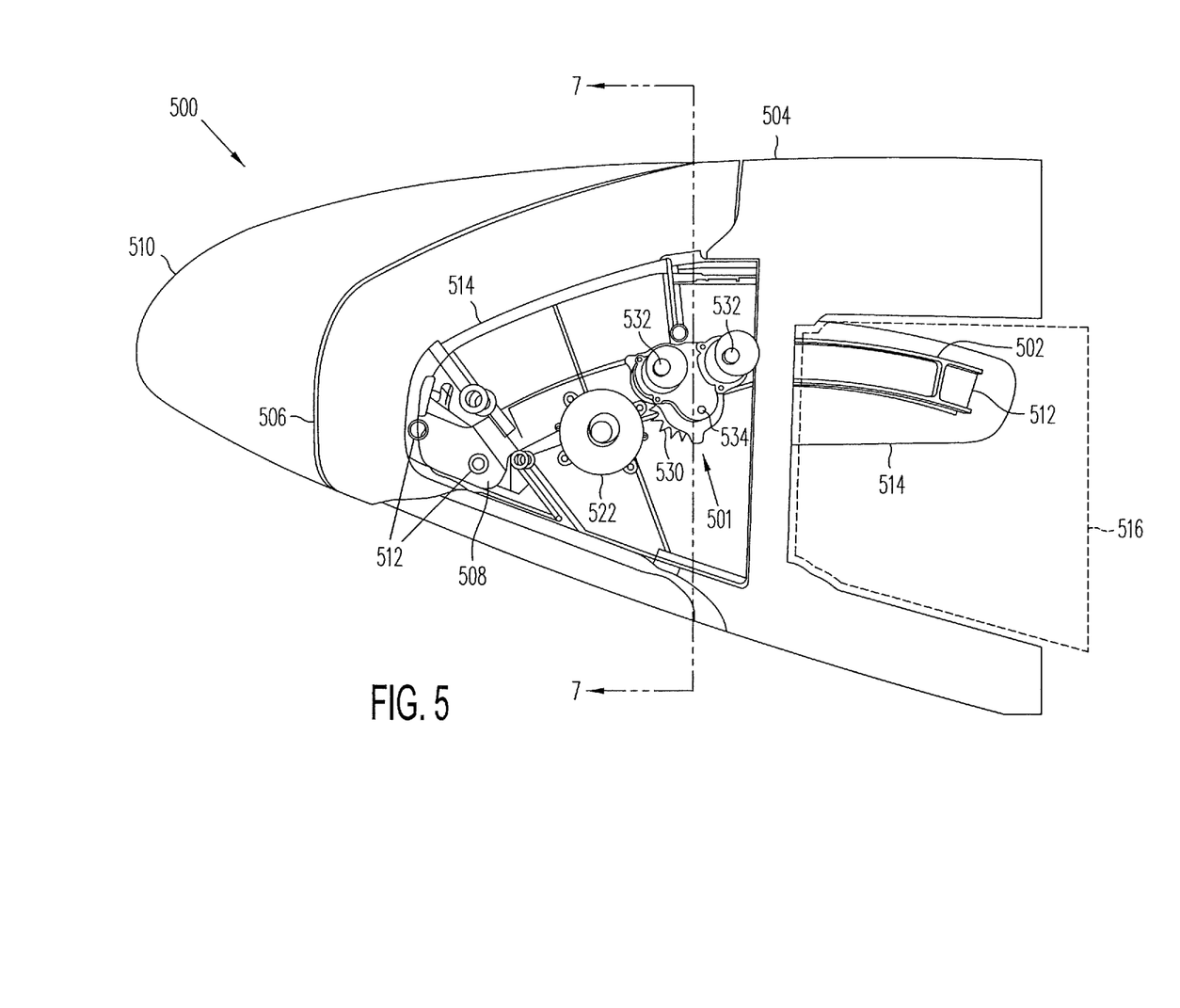
FIG. 5 is a partial elevation view of an example embodiment of an apparatus for detecting slat skew in accordance with the present invention.
Figure 6A:
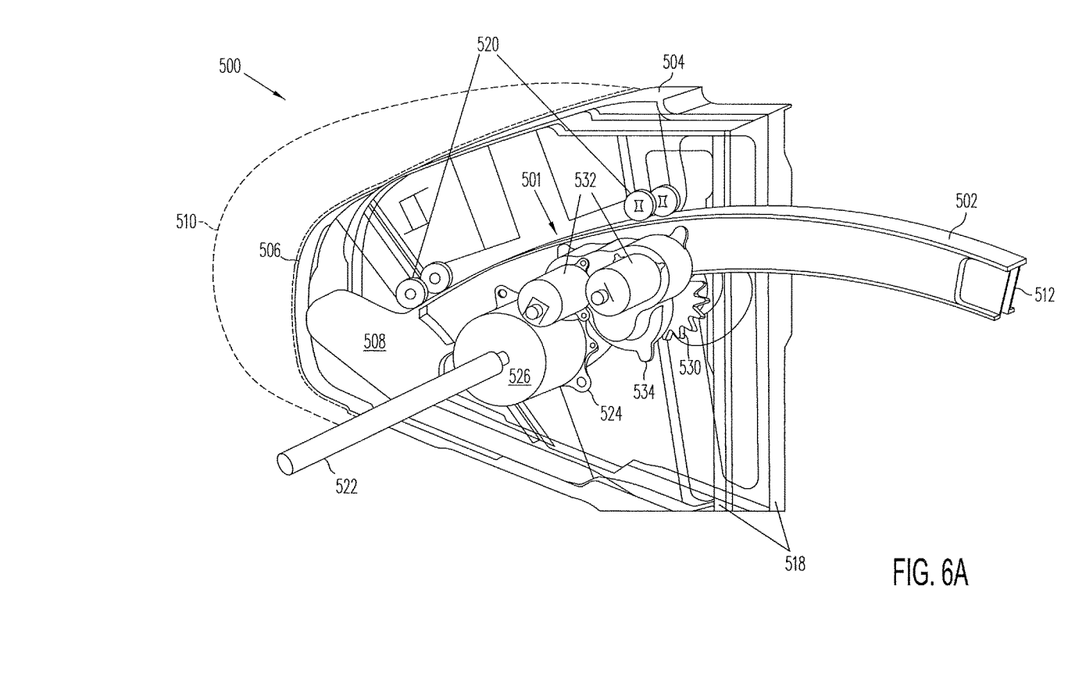
FIGS. 6A and 6B are rear, upper and rear, lower perspective views, respectively, of the example slat skew detecting apparatus of FIG. 5.
Figure 6B:
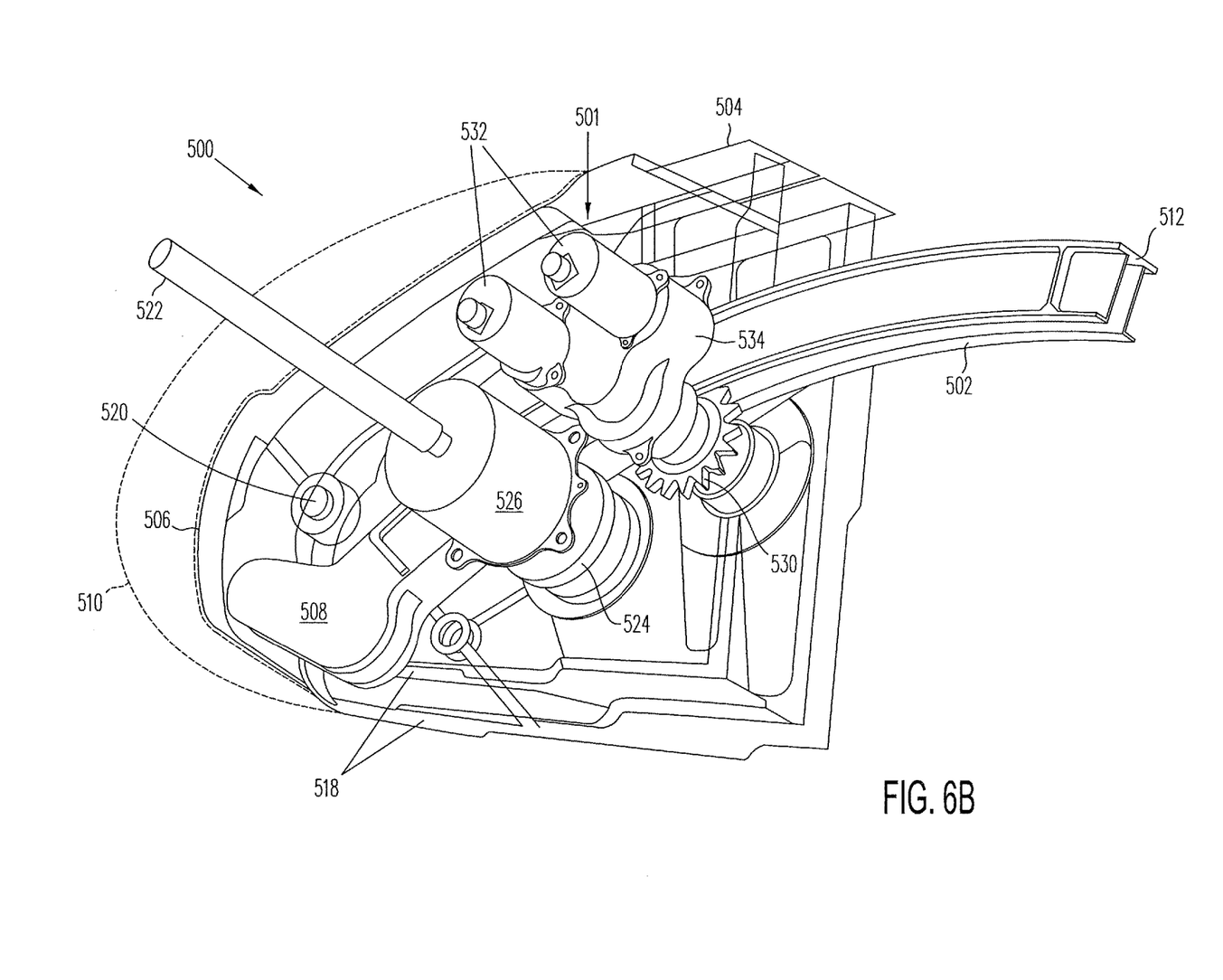

An example embodiment of an aircraft leading edge wing slat skew detection system 500, comprising a skew detection apparatus 501 that can be utilized at the blind spot of the inboard end of slat 6, or indeed, at the respective two ends of any one of the slats 1-14 of the aircraft 100 of FIG. 1 in place of the prior art systems 300 and/or 400 described above, is illustrated in the partial elevation view of FIG. 5. FIGS. 6A and 6B are rear, upper and rear, lower perspective views, respectively, of the example slat skew detection apparatus 501, and FIG. 7 is a partial cross-sectional view of the example flap skew detection apparatus 501 of FIGS. 5, 6A and 6B as seen along the lines of the section 7-7 taken in FIG. 5.

Figure 7:
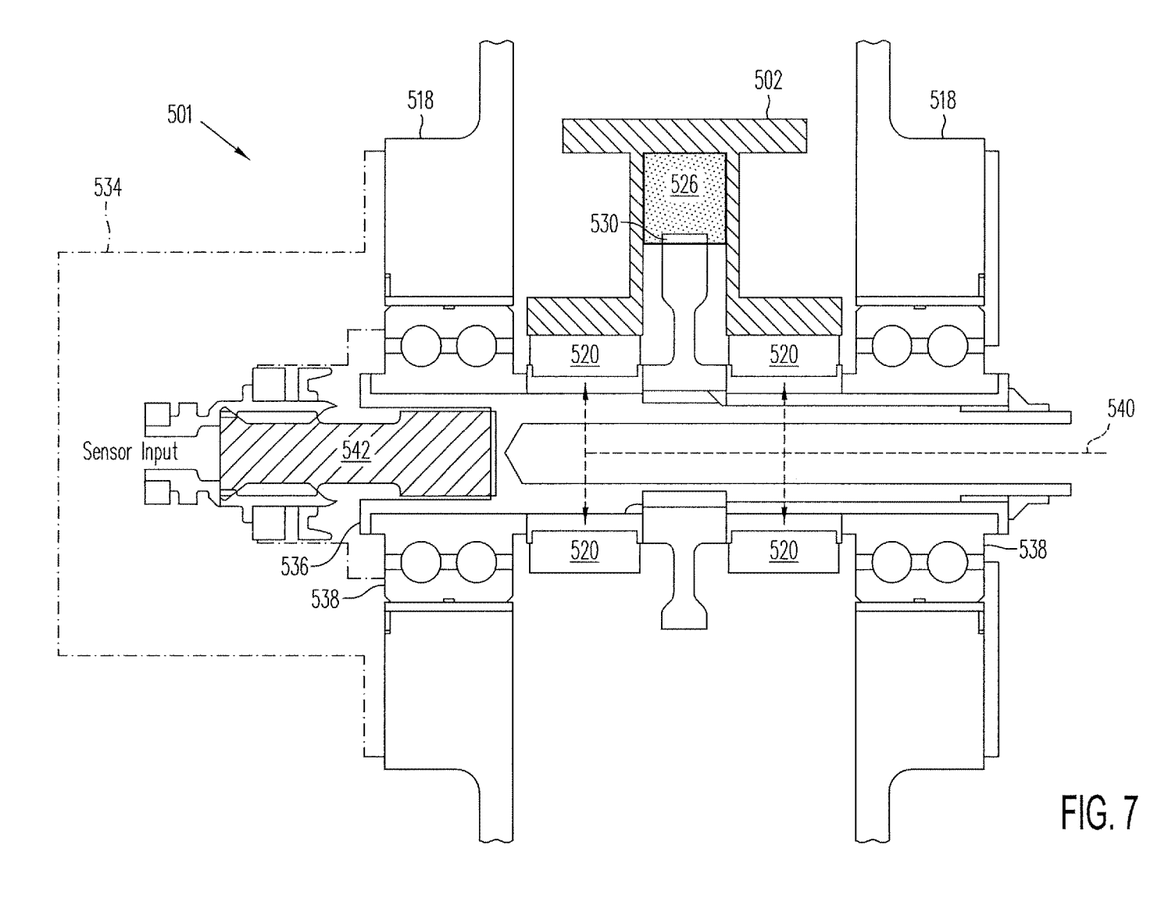
FIG. 7 is a partial cross-sectional view of the example flap skew detection apparatus of FIGS. 5, 6A and 6B as seen along the lines of the section 7-7 taken in FIG. 5.

As can be seen in FIGS. 5-7, the novel skew detection system 500 is similar in some respects to the skew detection system 400 of FIG. 4, in that it includes an elongated slat track 502 that is moveably supported in an aircraft wing 504 for longitudinal movement toward and away from a leading edge 506 of the wing 504. The track 502 has a forward end 508 that is coupled to a wing slat 510 for conjoint movement therewith. In particular, the forward end 508 of the track 502 is coupled to an end of the slat 510, for example, to the inboard end of slat 6, and it should be understood that a similar arrangement (not illustrated) can be implemented at the opposite, e.g., outboard, end of the wing slat 510, in a manner similar to the system 400 discussed above in connection with FIG. 4.

In the particular example embodiment of FIGS. 5-7, the forward end 508 of the track 502 is coupled to the slat 510 by a plurality of fasteners 512, such as bolts, that extend through both the track 502 and a rearwardly extending tongue on the wing slat 510, although other coupling mechanisms can be used instead or in place of the bolts and tongue. As further illustrated in, e.g., FIG. 5, the track 502 can include a rear end 512 that extends rearwardly into the wing 504 and can, for example be enclosed within a housing 514 to isolate it from the contents of, for example, a fuel tank 516 disposed within the wing 504. The slat track 502 is upwardly arched such that, as discussed above in connection with the system 400 of FIG. 4, the slat 510 moves forward and downward relative to the leading edge 506 of the wing 504 upon extension, and rearward and upward relative to the leading edge 506 upon retraction.

The slat track 502 can be supported within the wing 504 by a pair of support ribs 518 located within the wing 504 and respectively disposed and on opposite sides of the track 502. Advantageously, the track 502 can be moveably supported within the wing 504 between a plurality of bearings 520, e.g., roller bearings or ball bearings. As illustrated in FIGS. 6A and 7, these can comprise upper and lower sets of the bearings 520.

An actuator 522 is configured to selectably drive the track 502 between retracted and extended positions relative to the leading edge 506 of the wing 504. In the particular example embodiment illustrated, the actuator 522 comprises a drive gear 524 that is rotatably mounted in the wing 504 and disposed in meshing engagement with a rack gear 526 disposed on the track 502, and a rotary actuator 528 drivingly coupled to and configured to selectably rotate the drive gear 524 in opposite directions to move the slat 510 longitudinally in and out of the wing 504. As illustrated in FIG. 7, the cross-section of the track 502 can comprise, for example, an inverted U shape, and the rack gear 526 can be disposed internally of the U at its bottom.

As illustrated in FIGS. 5-7, the slat skew detection apparatus 501 of the system 500 comprises a pinion gear 530 that is rotatably mounted in the wing 504 and disposed in rolling engagement with the rack gear 526 of the track 502, and a rotary sensor 532 that is coupled to the pinion gear 530 and configured to sense the longitudinal position of the slat 510 relative to the leading edge 506 of the wing 504 as a function of the rotational position of the pinion gear 530. As illustrated in FIGS. 6, 6A and 6B, the sensor 532 can comprise a pair of sensors 532 that are coupled to the pinion gear 530 in parallel for purposes of redundancy, i.e., their outputs can be averaged in normal use, and if one sensor 530 fails in use, the output of the other can be used in place of the average.

The sensor(s) 532 can be rotatably coupled to the pinion gear 530 through a gear train contained in a gear box 534, which, through gear reduction or gear multiplication, can enable a small number of turns of the pinion gear 530 to effect a large number of turns of the sensor 532, or vice versa. In this way, only a small rotation of the pinion gear 530, e.g., less than a single revolution, might be experienced between a full extension and a full retraction of the slat 510, to produce a relatively large number of revolutions of the input of the rotary sensor 532. Thus, in some advantageous embodiments, the pinion gear 532 can, for weight and size reduction purposes, comprise a gear with a circumferential segment that has no teeth, i.e., a sector gear.

In the particular example embodiment of the apparatus 501 illustrated in FIG. 7, the pinion gear 530 is fixed, e.g., splined, on a shaft 536 that is rotatably mounted in the track support ribs 518 of the wing 504 by, e.g., a plurality of bearings 538, e.g., roller bearings or ball bearings. The shaft 536 can contain a central lumen 540 with suitably disposed openings to the bearings 520 of the track 502, through which a lubricant injected into the lumen can reach and lubricate the track bearings 520. An input end of the gear train of the gear box 534 can be coupled to an output end the shaft 534 by a short "quill shaft" 542.

As those of some skill will appreciate, by mounting the skew detection apparatus 501 of the system 500 coaxially with the support bearings 520 of the slat track 502 and inboard of the two support ribs 518, a skew detection apparatus results that is substantially more compact and lighter in weight than that of the skew detection system 400 described above, and further, by utilizing standard gear and sensor components, one that is also less costly to implement. In this regard, the sensor 530 can comprise a variety of conventional, off-the-shelf rotary sensors, e.g., encoders, potentiometers, or resolvers of almost any practical resolution and precision desired. For example, the sensor 530 can comprise a rotary or shaft encoder of a known type that utilizes electroconductive principles, optical principles, or magnetic principles, e.g., an "on-axis" magnetic encoder or an "off-axis" magnetic encoder.

Operation of the skew detection system 500 is relatively straightforward: The slat track 502, and hence, the end of the wing slat 510 to which it is attached, is driven longitudinally between retracted and extended positions relative to the leading edge 506 of the wing 504 by the slat actuator 522. As the track 502 is extended and retracted, the pinion gear 530 rotates through an angular displacement that is proportional to the longitudinal displacement of the track 502, and hence, the longitudinal position of the end of the slat 510 coupled to its outer end 508. Thus, the longitudinal position of the slat 510 can be sensed by sensing the rotational position of the pinion gear 530 with the rotary sensor 532. Detection of a skewed condition of the slat 510 can be effected by using the sensed position of the end of the slat 510, e.g., by comparing the sensed position of the end of the slat 510 with the position of the opposite end of the slat 510, and/or to the position of an end of another slat, for example, with that of the bilaterally symmetrical twin of the slat 510 disposed on the other wing of the aircraft.

As those of some skill will by now appreciate, and depending on the particular application at hand, many modifications, substitutions and variations can be made in and to the materials, apparatus, configurations and methods of making and using the aircraft slat skew detection systems of the present disclosure without departing from the spirit and scope thereof. In light of this, the scope of the present invention should not be limited to those of the particular embodiments illustrated and described herein, as they are merely by way of some examples thereof, but rather, should be fully commensurate with that of the claims appended hereafter and their functional equivalents.

What is claimed is:

1. An apparatus, comprising:
an elongated track moveably supported in a wing of an aircraft for longitudinal movement toward and away from a leading edge of the wing, the track having a forward end coupled to a wing slat for conjoint movement therewith;
a rack gear disposed on the track;
a drive gear mounted on a first shaft for rotation within the wing and disposed in meshing engagement with the rack gear of the track;
an actuator drivingly coupled to the first shaft and operable to selectably rotate the drive gear in opposite directions so as to selectably drive the track between retracted and extended positions relative to the leading edge of the wing;
a pinion gear mounted on a second shaft for rotation within the wing and disposed in rolling engagement with the rack gear on the track, the second shaft being distinct from the first shaft; and
a sensor coupled to the pinion gear and configured to sense a longitudinal position of the slat as a function of a rotational position of the pinion gear.

2. The apparatus of claim 1, wherein the track is supported in the wing by a pair of support ribs located within the wing and respectively disposed on opposite sides of the track.

3. The apparatus of claim 1, wherein the track is moveably supported in the wing by at least one roller bearing or at least one ball bearing.

4. The apparatus of claim 1, wherein the pinion gear is disposed on a shaft that is rotatably mounted in the wing by at least one roller bearing or at least one ball bearing.

5. The apparatus of claim 1, wherein the sensor is rotatably coupled to the pinion gear through a gear train.

6. The apparatus of claim 1, wherein the pinion gear comprises a sector gear.

7. The apparatus of claim 1, wherein the sensor comprises an encoder, a potentiometer, or a resolver.

8. The apparatus of claim 1, wherein the sensor comprises a shaft encoder, and wherein the shaft encoder comprises a conductive encoder, an optical encoder, an on-axis magnetic encoder or an off-axis magnetic encoder.

9. An aircraft comprising the apparatus of claim 1, wherein the apparatus is within the wing of the aircraft.

10. A method, comprising:
coupling the forward end of the track of the apparatus of claim 1 to an end of the slat; and
sensing the longitudinal position of the end of the slat relative to the leading edge of the wing using the sensor.

11. The method of claim 10, further comprising detecting a skewed condition of the slat using the sensed position of the end of the slat.

12. The method of claim 11, wherein the detecting comprises comparing the sensed position of the end of the slat with a position of an opposite end of the slat.

13. The method of claim 11, wherein the detecting comprises comparing the sensed position of the end of the slat with a position of an end of another slat.

14. A method, comprising:
    driving an end of a wing slat longitudinally with an elongated track between a retracted position and an extended position relative to a leading edge of the wing using an actuator coupled to the elongated track through a first shaft and a drive gear;
    rotating a rotary position sensor using the elongated track coupled to the sensor through a pinion gear and a second shaft, the second shaft being distinct from the first shaft; and
    sensing a longitudinal position of the end of the slat as a function of a rotational position of the pinion gear.

15. The method of claim 14, further comprising detecting a skewed condition of the slat using the sensed position of the end of the slat.

16. The method of claim 15, wherein the detecting comprises comparing the sensed position of the end of the slat with a position of an opposite end of the slat or a position of an end of another slat.

* * * * *